(12) United States Patent
Westin et al.

(10) Patent No.: US 7,740,814 B2
(45) Date of Patent: Jun. 22, 2010

(54) COMPOSITE MATERIALS AND METHOD OF ITS MANUFACTURE

(76) Inventors: Gunnar Westin, Karlaplan 19B, 115 20 Stockholm (SE); Annika Pohl, Häggvägen 2, 135 52 Tyresö (SE); Åsa Ekstrand, Granberga 3, 186 91 Vallentuna (SE)

( * ) Notice: Subject to any disclaimer, the term of this patent is extended or adjusted under 35 U.S.C. 154(b) by 109 days.

(21) Appl. No.: 11/794,827

(22) PCT Filed: Jan. 3, 2006

(86) PCT No.: PCT/SE2006/000004

§ 371 (c)(1),
(2), (4) Date: Sep. 4, 2007

(87) PCT Pub. No.: WO2006/073357

PCT Pub. Date: Jul. 13, 2006

(65) Prior Publication Data

US 2008/0146440 A1    Jun. 19, 2008

(30) Foreign Application Priority Data

Jan. 7, 2005    (SE)    .................................... 0500031

(51) Int. Cl.
C01F 1/00 (2006.01)
C01F 17/00 (2006.01)
C01G 49/02 (2006.01)
C01G 53/04 (2006.01)
B01J 23/58 (2006.01)
B01J 23/78 (2006.01)
B01J 21/04 (2006.01)

(52) U.S. Cl. .................. 423/115; 423/21.1; 423/22; 423/23; 423/138; 423/155; 502/330; 502/331; 502/332; 502/333; 502/334; 502/335

(58) Field of Classification Search ......... 502/330–335; 423/21.1, 22, 23, 115, 138, 155
See application file for complete search history.

(56) References Cited

U.S. PATENT DOCUMENTS

| | | | |
|---|---|---|---|
| 5,030,608 A * | 7/1991 | Schubert et al. ............. | 502/300 |
| 5,462,903 A | 10/1995 | Rousset et al. | |
| 6,033,735 A * | 3/2000 | Ederyd et al. ............... | 427/380 |
| 2004/0229036 A1 | 11/2004 | Gottgried et al. | |

FOREIGN PATENT DOCUMENTS

WO    03/101605 A1    12/2003

OTHER PUBLICATIONS

Gadenne et al., "Influence of the Deposition Conditions on the optical, electrical and magnetic properties of sputtered FE-$Al_2O_3$ and Ni-$Al_2O_3$ nanocermet films," Mat. Sci and Eng., vol. A168, pp. 257-261 (1993).
Kraus et al., "Synthesis and magnetic properties of Ni-$Al_2O_3$ thin films," J. Appl. Phys., vol. 82, No. 3, pp. 1189-1195 (Aug. 1, 1997).

* cited by examiner

Primary Examiner—Stanley Silverman
Assistant Examiner—Daniel Berns
(74) Attorney, Agent, or Firm—Young & Thompson (57) ABSTRACT

A novel solution route has been developed that after heat-treatment to 500-600° C. under inert atmosphere, yields highly porous composites of nano-sized metal (Ni) particle inclusions in ceramics ($Al_2O_3$). Metal loadings could be made from <1% to >95% Ni. The metal inclusion sizes in the Ni—$Al_2O_3$ system with the 10 atom % Ni sample were 4-7 nm, while for the 75 atom % Ni sample they were 5-8 nm. It was shown that the 10 atom % Ni sample could be used as a catalyst for the conversion of $CO_2$ and $CH_4$ in the temperature range 550-700° C., while higher temperatures led to growth of the Ni particles and carbon poisoning over time. The solution routes could also be deposited as thin dense films containing <10 nm Ni particles. Such films with high Ni-particle loadings deposited on aluminium substrates have shown very good solar heat absorber proficiency and provide good substrates for carbon tube growth.

28 Claims, 3 Drawing Sheets

COMPOSITE MATERIALS AND METHOD OF ITS MANUFACTURE

The present invention relates to a method of fabricating composite ceramic materials with nano-sized metal inclusions. In particular it relates to such a material having a high content of well-defined nano-sized metal inclusions.

BACKGROUND OF THE INVENTION

Ceramic materials with nano-sized inclusions have received increased interest during the recent years. The interest lies both in the possibilities to make fundamental studies on new properties associated with the nano-size and in applications in e.g. optic absorption and non-linear materials, catalysts and magnetic materials. One might also envisage applications of these metal-ceramic composites as precursors for nano-structured construction ceramics with excellent toughness/hardness properties. Most promising routes for preparation of nano composites of large scales and complex systems goes through solutions of inorganic salts or metal-organic compounds due to their cost effectiveness and possibilities in yielding complex compositions.

In the $Ni-Al_2O_3$ system, the materials are usually prepared from precursors first yielding NiO and/or $NiAl_2O_4$, followed by reduction with hydrogen gas to $Ni-Al_2O_3$. This is an inefficient approach since the reduction of especially the binary oxide is difficult and requires high temperatures or long times under reducing atmospheres. The metal formed during the reduction is then much more mobile on the alumina surface and larger metal particles are easily formed as well as very wide metal particle size distributions.

Supported nickel catalysts are among the most active for the $CO_2$ reforming of $CH_4$ to produce syngas, i.e. CO and $H_2$. However, there is a well-documented problem of carbon deposition (poisoning), which deactivates the catalyst, when the nickel-particles are too large.

Metal nano-inclusion ceramic materials (NIM:s) with the metallic particles in the 1-20 nm size range have great potential to become the leading materials in a very wide range of materials, in e.g., mechanically or thermally durable coatings or compacts for cutting tools and light engines (high-performance structural ceramics), selective optical absorption devices for solar heat-absorption, catalysts, highly non-linear optics for photonic switches and frequency converters, transformers, magnetic sensors, temperature stable colour coatings and as substrates for carbon nano-tube growth for use as cold cathode emitters and nano-electronics.

Despite this great potential in a wide area of high- and medium-tech applications, there is still very limited knowledge concerning how to successfully tailor the sizes, contents and shapes of the metal particles and the morphology of the matrix, e.g. as thin films, compacts or porous materials. The methods used for preparation include a variety of physical and chemical techniques. However, the physical and chemical vapour based routes suffer from the drawback that they cannot be used for large-scale applications of NIM-film and NIM-powder preparation and they are comparatively expensive and also require sophisticated vacuum equipment. These techniques are normally restricted to small surfaces, a few centimetres in size, due to limitations in vacuum chamber size and control of the deposition. The deposition is also relatively slow and is often dependent on the substrate.

The chemical routes to $Al_2O_3$ based NIM:s, have to a large extent been directed to powders only, and many of the processes reported use high temperatures and/or long annealing times and cannot be used in film preparation. Several processes have been published with the common feature that a salt based solution is gelled or precipitated and annealed in air at different temperatures, normally between 500° C. and 1200° C., yielding a ceramic material containing NiO and $Al_2O_3$ and/or $NiAl_2O_4$. This powder is then reduced under hydrogen-containing atmosphere during heat-treatment for several hours at $\leq 1000°$ C.[E. Breval et al., *J. Mater. Sci.*, 27 1464-1468 (1992)]

Another common partly solution based route for powder preparation is to start with a slurry of $Al_2O_3$ powder and nickel containing solution. After evaporation of the solvent the obtained powder is then dried at varying temperatures, typically between 50 and 500° C., and then reduced by heating in $H_2$ at temperatures $\geq 500°$ C. [see W. H. Tuan, H. H. Wu, and T. J. Yang, *J. Mater. Sci.*, 30 855-859 (1995), T. Sekino, T. Nakajima, S. Ueda, and K. Niihara, *J. Am. Ceram. Soc.*, 80 1139-1148 (1997)].

Some of the above discussed processes are capable of producing small metal particles, but the control of the powder surface area and morphology is quite limited. There are complex processing routes available involving several steps including the use of the potentially dangerous hydrogen gas at high temperatures and long annealing times. The high temperature and long annealing times leads to a large energy consumption and makes the process expensive, and also reduces the number of possible applications.

Films of $Al_2O_3$-based NIM:s are usually made by sputtering techniques [see e.g.: M. Gadenne, P. Gadenne, M. T. Ramdou, J. P. Seagaud, H. Lassri, R. Krishnan, and C. Sella, *Materials Science and Engineering, A*168 257-261 (1993)]. There is one solution-based route reported. It uses spin-coating of a solution of nickel 2-ethyl-hexanoate and aluminium tri-sec-butoxide (which is a complex synthesis route by refluxing, centrifugation, vacuum evaporation, preformed with two high temperature steps), and the gel film formed is heated to 1200° C. in air to form the spinel $NiAl_2O_4$, which is then reduced by heating in $H_2$ at 950° C. for 5 minutes. [G. T. Kraus, Y.-C. Lu, J. E. Trancik, D. M. Mitro, E. P. Giannelis, M. O. Thompson, and S. L. Sass, *J. Appl. Phys.*, 82 1189-1195 (1997)].

JP 07-114048 discloses hyperfine particles of a metal selected from Fe, Co and Ni. The particles are incorporated into a matrix of a non-linear optical material. The matrix has an Al oxide phase and an amorphous alloy phase, consisting of the metal and Al. Metal particles <50 Å can be incorporated, where the alloy phase consists of $\leq 50$ wt % Al and Fe, Co or Ni. The optical material can be produced as a thin film by sputtering or other methods.

In U.S. Pat. No. 5,462,903 (CNRS) there is disclosed nano-composite powders of alumina and metal constituted of grains of micronic size. Each grain comprises a compact matrix of alumina, in which there are dispersed crystallites of metals or alloys, the size of which is less than 50 nm. The ratio by weight of metal/alumina is less than 30%.

So far, all routes to $Ni-Al_2O_3$ are producing only low nickel loadings, typically up to about 30%, but many applications, such as in magnetic applications and solar heat absorption applications, require very high metal loadings, typically 60-90%.

The compositions of nickel metal inclusions in alumina, $Ni-Al_2O_3$, and some of its compositionally modified variants are among the most versatile NIM:s. This type of NIM with different metal particle sizes and concentration (volume content of metal particles in the matrix alumina) in the forms of high surface area materials, films and compacts have many important areas of application.

SUMMARY OF THE INVENTION

In view of the shortcomings of the prior art methods and materials, the object of the present invention is to provide a method of manufacturing materials of the kind mentioned in the preamble, having superior properties, particularly in terms of metal loading, compared to materials made according to prior art methods, and which is simple and suitable for up-scaling to industrial scale. The method should also open up for application areas requiring high metal loadings (concentration).

This object is achieved in accordance with the invention by the method as defined in claim 1.

The novel material is defined in claim 20.

A major advantage with the method according to the present invention is that it can be performed at low temperatures, i.e. $\leqq 600°$ C. Furthermore, it can easily be up-scaled to industrial scale, e.g. large surfaces can be coated, larger batches of powder can be produced, simple procedures are required for making the starting solutions, the reaction is carried out by simple mixing and stirring, the chemicals employed are cheap, no $H_2$ is used, and the heat treatment is fast, and as already mentioned, it takes place at relatively low temperatures.

All taken together, the method according to the invention enables a very cost efficient production of the materials in industrial scale.

The possibility according to the invention to prepare materials having the very high content of metal inclusions of well-defined and small sized particles, opens up a wide range of applications in many different fields, such as solar energy applications, catalysis, magnetic applications, non-linear optics, high performance ceramics just to mention a few.

There are some key issues for successful application, and the requirements in the preparation of NIM:s can be summarized as follows:

The routes should provide good control of particle sizes with a narrow size distribution (down to about 5 nm, allow for a wide range of metal particle loadings, from a few percents to around 95%, with retained size control and without clustering of the particles, be flexible allowing for hetero-metallic metal inclusions, make it possible to quickly deposit large area films and/or make it possible to prepare high surface area powders, at low cost, with few steps, and with simple equipment, allow for preparation of films at low temperatures and short annealing time, preferably below the softening point of the important Al substrate of about 600° C., allow for film deposition on different types of substrates, e.g. metals, ceramics and glasses, make it possible to prepare porous materials of high surface area for use in e.g. catalysis, and make it possible to easily prepare very fine starting powders for sintering into compacts.

These requirements are met by the method according to the present invention.

However, at very high metal loadings, such as those indicated above, i.e. 95%, particle sizes tend to become somewhat larger than for lower concentrations.

DETAILED DESCRIPTION OF THE INVENTION AND PREFERRED EMBODIMENTS THEREOF

Generally, the present invention relates in a first aspect to a method of making a composite material comprising metal particles in the nanometer range in a ceramic matrix. The method comprises providing a metal salt solution of at least two metals, wherein the metals are complexed with a multifunctional organic compound capable of strongly coordinating metals. The solvent is evaporated from the mixture to provide a material in the range from a dry powder to a viscous liquid. This yields a precursor material that subsequently can be use for different applications. To convert it to the desired composite material, the precursor is heated in an inert atmosphere.

Preferably, the metal salt solution comprising at least two metals is prepared by making a first solution of at least one metal-alkoxide compound in a solvent comprising an organic acid and a polar organic solvent, the metal(s) of said compound being capable of forming ceramic oxide(s). To said first solution is added a multifunctional organic compound, as a complexing agent, capable of strongly coordinating metal. At least one or more further solution is prepared by dissolving a metal salt soluble in a polar organic solvent, and adding thereto a multifunctional organic compound capable of strongly coordinating metal salts, combining the further solution(s). The first and further solution(s) are combined to provide said solution of at least two metals.

Preferably, the metal(s) in the first solution is/are selected from Al, Fe, Mg, Ga, Mg, Ca, lanthanides. The metal in the further solution(s) should be more easily reducible than the metal in the first solution, and is/are preferebly selected from Co, Ni, Cu, Pt, Pd, Ag, Au, Bi, Pb, Sn, Fe, Ru, W, Mo, V.

The first solution preferably comprises an acid selected from carboxylic acids having short alkyl chains, suitably acetic acid, propionic acid, lactic acid.

In an alternative embodiment the acidic first solution also comprises metal-nitrate, preferably $Al(NO_3)_3 \cdot 9H_2O$.

The alkoxogroup in the metal alkoxide is preferably selected from propoxo, iso-propoxo, sec-butoxo, ethoxo, metoxo, methoxyethoxo ligands, and a particularly preferred metal-alkoxide is Al-iso-propoxide.

The multifunctional organic compound suitably contains —OH (alcohol), —NH, =NH (imine), —CO—$CH_2$—CO— (beta-diketonato), —COOC—(ester), —CO—$NH_2$ (amide), or —COO (carboxylic acid) functionalities, and a particularly preferred multifunctional organic compound is triethanolamine. A function of these are to inhibit crystallisation of metal salt in solution.

The first and the second solutions are suitably stirred separately before combining them, preferably for at least 5 minutes, more preferably for 10 minutes, and most preferred for at least 15-20 minutes.

The combined first and second solutions can also be stirred for an additional period of time, suitably at least an additional 5 minutes, preferably at least 10 minutes, most preferably at least 15 minutes.

The polar organic solvent can be selected from alcohols, suitably methanol, ethanol, propanol, iso-propanol, glycol, glycerol, ethylacetate, aceton, or from dimethylformamide, acetonitrile.

In the method according to the invention, the heating is preferably performed at an elevated temperature in the range 500-900° C., preferably 500-600° C., and suitably the material is subjected to a temperature ramp of 1-100° C., preferably 10-50° C. min$^{-1}$, suitably 30° C. min$^{-1}$, in order to reach the desired temperature.

Evaporation is preferably performed while spraying the solution onto an object. Alternatively, the evaporation is performed by exposing the mixture to a stream of N$_2$ gas or low pressure produced by a water-jet pump connect to a tap/faucet or a vacuum pump.

The composite material resulting from the method according to the invention is any of a powder, a film or a coating.

In the case where the composite material formed is a coating or a film, it is made by using the solution or partly evaporated solution of at least two metals, for preparation of films or coatings by e.g. spin-coating, dipping, spraying or painting.

In a second aspect the invention provides a novel composite material comprising metal particles in the nanometer range in a ceramic matrix, the concentration of metal particles being >1%, preferably >10%, preferably >20, preferably >30, preferably >40, preferably >50%, preferably >60%, preferably >70%, more preferably >76%, preferably >78%, preferably >80%, and up to 90%, or more preferably up to 92%, even more preferably up to 94%, and most preferably up to 98%.

In the case of a film, the material has a concentration metal particles which is <50%, preferably <40%, preferably <30%, preferably <20, preferably <10%, most preferred about 1%.

For making films the process is conducted at low temperature, suitably <600°C. Films according to the invention are suitably coated on Al.

The average size of the metal inclusions is 6.55, ranging between 5-8 for lower loadings, 7.68 nm, ranging between 6-9 nm for higher loadings, with a standard deviation of 15% for both size distributions (600° C., 10° C./min) (smaller sizes of 3-6 nm are obtained (no standard deviation calculated) at 100° C. min$^{-1}$, and 600° C.).

The invention, as mentioned above, also provides a precursor material for the preparation of ceramic material with nano-sized metal inclusions. The precursor comprises a mixture of a first solution of at least one metal-alkoxide compound in a solvent comprising an organic acid and a polar organic solvent and a multifunctional organic compound capable of strongly coordinating metal ions, the metal(s) being capable of forming a ceramic oxide(s), and a second solution of a metal salt soluble in said polar organic solvent further comprising a multifunctional organic compound capable of strongly coordinating metal ions, said precursor material exhibiting rheological properties in the range from a dry powder to a viscous liquid.

Various kinds of objects can be coated with a composite material according to the invention, and if the metal particles are magnetic, the object can be e.g. a transformer, in which case the metal loading is in the range 70-95%, preferably 80-92%, most preferably about 90%. Another object suitable for materials with magnetic particles is a magnetic sensor.

The composite material can be used for making catalysts, and thus a catalyst comprising a composite material is a further aspect of the invention. In a catalyst the concentration of metal is suitably <50%. In preferred embodiments, the catalyst further comprises a porous powder of alumina loaded with <10 nm sized Ni particles of which a portion is accessible for gases at the surface, to render the catalyst suitable for catalysis of production of syngas mixture from CO$_2$ (or O$_2$) and CH$_4$, without carbon filament poisoning.

Examples of objects that can be coated with the material according to the invention are any of a solar heat absorber device; a metal tube; a turbine blade.

Tools based on metal or hard metal can be provided with coatings of a material according to the invention to provide a wear resistant or chemically protective surface or coating on the tool.

The following description will illustrate the method according to the invention in detail.

The present invention generally provides a novel solution-route to metal-ceramic nano-composite materials, in which metal loadings ranging from very low to very high can be achieved at moderate temperatures. In one embodiment nickel-alumina nano-composite materials with 1-98 mol % Ni in Al$_2$O$_3$ can be made at 500-600° C. The materials obtained consist of a highly porous, X-ray amorphous ceramic alumina (Al$_2$O$_3$) network, homogeneously loaded with mono-dispersed metal (nickel) particles. Parameters such as heating rate and final temperature and holding time at the final temperature (annealing) can be used for controlling the Ni-particle sizes from ca 3-5 nm. Higher heating-rate and lower final temperature above 500° C., and no annealing yielded smaller particles. With the same heating rate and final temperature, the metal (Ni) particle sizes also depend to some extent on the concentration of metal used in the preparation, and are e.g. 6.55 nm (std. dev. 1.00 nm) for a material comprising 10% Ni and 7.68 nm (std. dev. 1.15 nm) for a material comprising 75% Ni, prepared at 600° C. with a heating rate of 10° C. min$^{-1}$.

A general outline of the method according to the invention is given below.

1) An aluminium acetate solution is prepared by dissolving Al(OPr$^i$)$_3$ in HOAc:MeOH (1:3 vol:vol) (this solution could also be substituted by or mixed with Al(NO$_3$)$_3$.9H$_2$O; this reduces risk of carbon residues, and increases the porosity of the material. The solution is separated from the small amount of precipitate formed, and the aluminium concentration is determined by atomic absorption spectroscopy (AAS) or gravimetrically after evaporation of the solvent and heating to >800° C. for 6 hours, whereupon 0.3 mol triethanolamine (TEA) per Al is added to the solution while stirring.

It should be noted that for other metals (such as Ag) which are relatively difficult to dissolve as acetates, other methanol soluble salts can be employed, such as nitrates containing only groups that can be easily removed during the heating process to 500-600° C. without leaving residues, such as sulphide and phosphate groups. In addition, strongly coordinating organic N-donor ligands which are stable in carboxylic acid with organic groups, and which increase solubility in the M—Al-precusror solution can be used.

2) A 9:1 mixture of Ni(NO$_3$)$_2$.6H$_2$O and Ni(OAc)$_2$.4H$_2$O is dissolved in methanol. To this solution is added 0.5 mol TEA (as a complexing agent) per mol Ni while stirring. Other compositions of Ni(NO$_3$)$_2$.6H$_2$O and Ni(OAc)$_2$.4H$_2$O mixtures could also be used.

3) The solutions from 1) and 2) respectively, are mixed to give final Ni:Al elemental ratios of 1 to 98 mol % Ni. The solvents are evaporated in air, and the obtained materials are heated in Ar or N$_2$ atmosphere to >500° C., to yield the Ni—Al$_2$O$_3$ composites.

The catalytic properties of the materials with respect to the CO$_2$ reforming reaction of CH$_4$ were investigated by mass-spectroscopy, powder-XRD and electron microscopy. It was found that the 10% Ni material can be used as a catalyst for conversion at temperatures between 500 and 700° C., while higher temperatures result in deposition of carbon tubes/fibres (referred to as "carbon poisoning"). This carbon poisoning is also observed at all temperatures for the 75% Ni material, and it is believed that the Ni particle size plays a role.

The present inventors have discovered a novel method of fabricating a composite ceramic material with nano-sized metal inclusions. It is a solution-based approach comprising the preparation of first and second starting solutions of $Al^{3+}$ and $Ni^{2+}$, respectively, each containing at least one multifunctional organic compound capable of strongly coordinating metal ions, combining said starting solutions, allowing the components to mix, evaporating the solvent, and finally heating in an inert atmosphere, whereby the composite material is formed as a powder. Using instead the mixed solution of $Al^{3+}$ and $Ni^{2+}$, as starting material, films can be deposited by methods such as spin-coating and heat treated into composite films.

The method according to the present invention is illustrated below by way of example, the first example being given in general terms for one embodiment ($Al_2O_3$/Ni system).

Abbreviations used:
HOiPr iso-propanol (2-propanol)
OiPr iso-propoxo group (2-propoxo group/ligand)
HOAc acetic acid
OAc acetate group
MeOH methanol
OMe metoxo group
TEA triethanolamine Now the invention will be further illustrated by way of non-limiting examples.

EXAMPLES

Example 1

Thus, two solutions were prepared separately, one containing Al-ions and one containing Ni-ions. Before synthesis, the glass equipment was carefully washed and dried at 150° C. for at least 1 hour, and cooled to room temperature under $N_2$ atmosphere, while preventing any ingress of moisture.

The Al-solution was typically prepared by dissolving 10 g of $Al(OiPr)_3$ in 500 ml of 1:3 HOAc:MeOH under $N_2$. To avoid formation of $Al(OMe)_3$ precipitate the HOAc was added before the methanol. After about 10 minutes the stirring was turned off and the solution was left for ca 12 hours to allow any undissolved material to settle. Instead of a solution containing only $Al(OiPr)_3$ it is also possible to use a mixture of $Al(OiPr)3$ and $Al(NO_3)_3.9H_2O$.

The clear and colourless $Al(OAc)_3$ solution (made from $Al(OiPr)_3$ but probably, without wishing to be bound by any theory, reacted with HOAc to form $HOiPr+Al(OAc)_3$ or a similar acetate), was separated from the precipitate and its concentration was determined either by atomic absorption spectroscopy or gravimetrically. The gravimetric determination was made on $Al_2O_3$, formed by adding water to a known volume (typically 2 ml) of the Al-solution, evaporating the solvents, and annealing at 1000° C. for 6 hours. To the Al-solution was added 0.3 mol TEA per mol Al, and left to stir for at least 15 minutes.

The Ni-solution was made by dissolving known quantities of either a 9:1 mixture of $Ni(NO_3)_2.6H_2O$ and $Ni(OAc)_2.4H_2O$, or just $Ni(NO_3)_2.6H_2O$ in methanol, although other mixtures with a high nitrate content can be used too. When the Ni-salts were completely dissolved 0.5 mol TEA per mol Ni was added to the solution, and left to stir for 15-20 minutes.

After addition of the TEA, the Al- and Ni-solutions were stirred separately for 15-20 minutes to make sure that the TEA was completely dissolved. This is crucial for obtaining a preferred narrow distribution of metal particle sizes in the final composite.

The Ni-solution was then added to the Al-solution and the mixed solution was stirred for an additional 15 minutes. This solution was used to prepare the Ni—$Al_2O_3$ composites in the form of powders and/or films.

Example 2

To make composite powders the solvents were evaporated at room temperature under constant stirring (in order to avoid preciptiation), until a dry greenish-white powder (low Ni-concentrations) or a green highly viscous liquid/sticky solid (high Ni-concentrations) had formed. These precursor powders/concentrates were then heated under inert atmosphere ($N_2$ or Ar) with a heating-rate of (1-100° C. $min^{-1}$) typically 10-50° C. $min^{-1}$, and the final temperature was usually 600° C. (500-600° C.).

Figure 1:
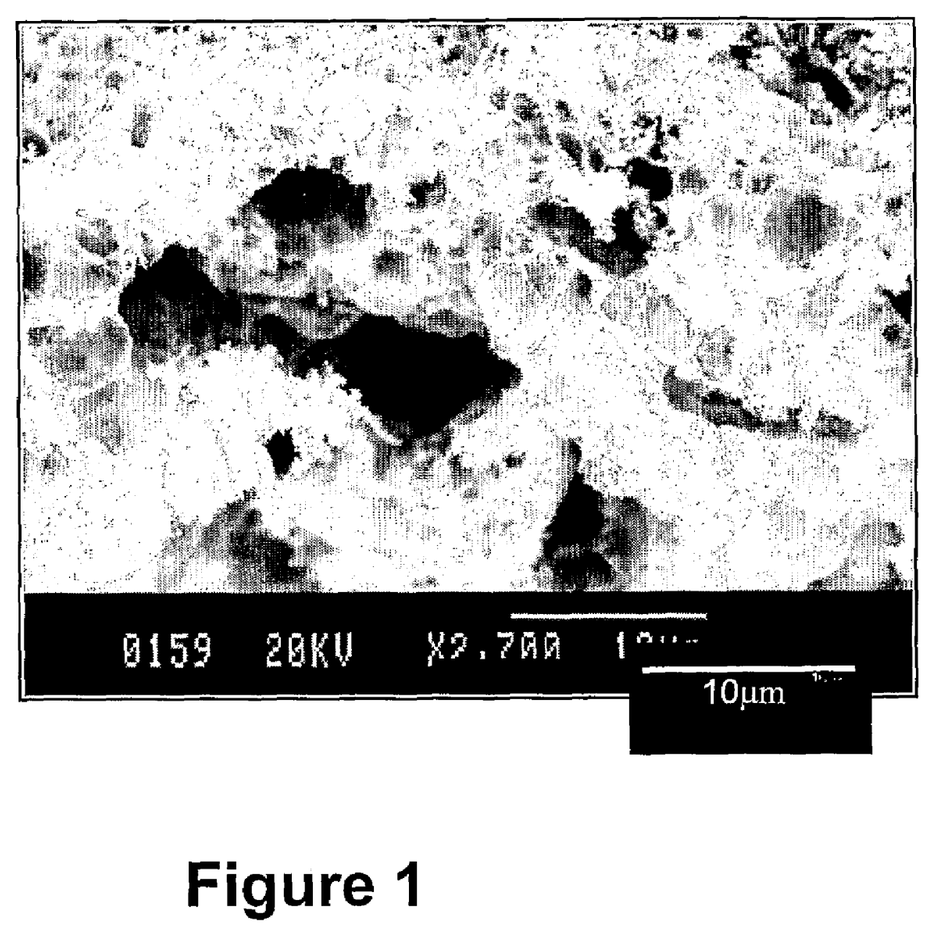
FIG. 1 is a SEM image of an Ni—$Al_2O_3$ composite microstructure with 75% Ni.
Figure 2A:
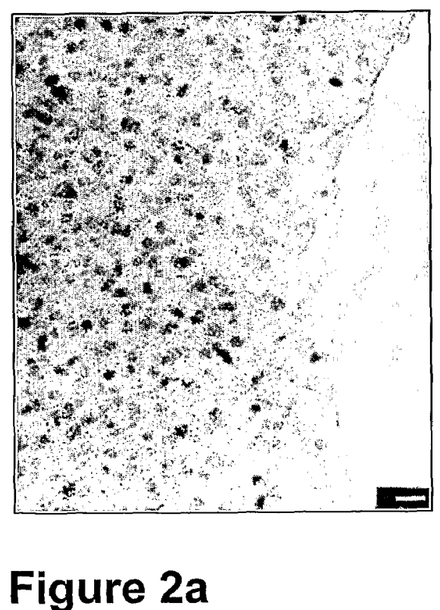
FIG. 2a-c are TEM images of Ni—$Al_2O_3$ composite materials with; 10% Ni (5-8 nm Ni-particles) (A) and 75% Ni (6-9 nm Ni-particles) (B) obtained at 600° C., 10° C. min$^{-1}$, and 10% Ni obtained at 600° C., 100° C. min$^{-1}$ (3-6 nm particles) (C).
Figure 2B:
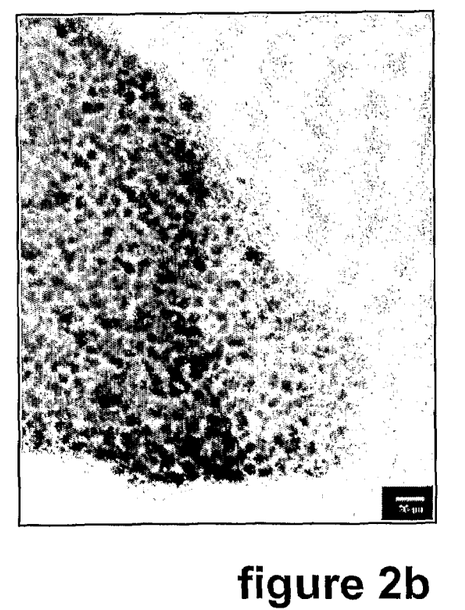
Figure 2C:
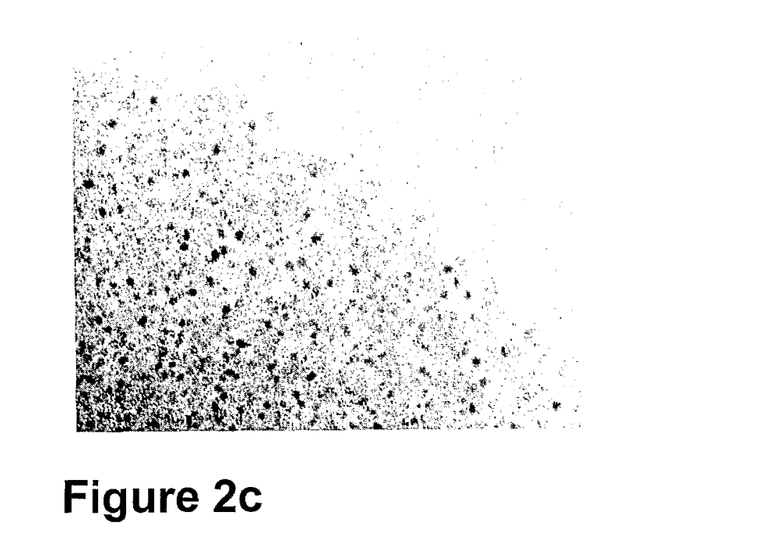

The heating-rate, final temperature and annealing time can be used to modify the metal particle size in the product. With the heating rate 30° C. $min^{-1}$ to 600° C., particles having a size in the range of 5-8 nm (average 6.55 nm) for a Ni loading of 10%, and in the range of 6-9 nm (average 7.68 nm) for a Ni loading of 75% were obtained. The particle sizes increased slightly with higher Ni/$Al_2O_3$ ratios, as well as with a lowered heating rate and annealing at the final temperature. See FIGS. 1 and 2.

Example 3

Figure 3:
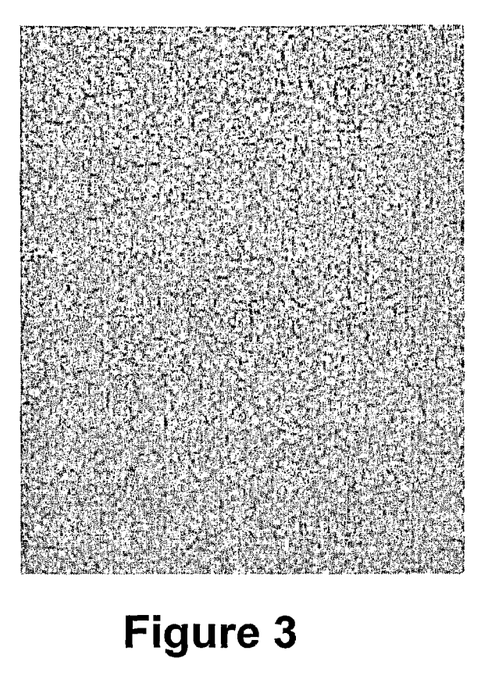
FIG. 3 is a SEM image of the surface of Ni—$Al_2O_3$ composite film with 80% Ni.

Films were made by spin-coating on different substrates; Al, $Al_2O_3$, Si, Pt, quartz glass, etc. The thickness of the films can be controlled by varying the concentration of the solution, and to some degree also the spin rate, which is normally in the range 2500 to 5000 rpm. The concentration was increased by evaporation, and solutions with up to ca 1.2M were used for spin coating. The "as coated" precursor films were converted to the Ni—$Al_2O_3$ composite films by the same heat treatment as described above for the powder samples yielding films such as that shown in FIG. 3. Other deposition techniques such as spray, dip and paint coating, well know to the skilled man, can also be used.

Example 4

(Cu,Ni)—$Al_2O_3$ composites were made by exchanging part of the Ni-salts for $Cu(NO_3).6H_2O$. ($Cu(OAc)_2.2H_2O$ was found to be unsuitable due to its low solubility). The Cu and Ni salts were dissolved separately in MeOH and TEA was added to each solution. Then the solutions were mixed and stirred for about 15 minutes, before the combined solution was added to the Al-solution.

Composites with varying Cu:Ni ratios were made with 10% total metal-loading in the $Al_2O_3$ matrix. It is not established whether or not it is possible to make higher metal loadings using Cu; it seems like the Cu-salts precipitates on evaporation of solvents, at least for 50% metal and higher. Probably, but without wishing to be bound by theory, the chemistry in solution makes it difficult to maintain the Cu salt at a high concentration, and thus the Cu salt precipitates. This problem may be solved by using some other complexing agent than TEA.

The route should be applicable to several similar systems with different metals or matrixes. The metals should be added in the form of salts, typically acetate or nitrate, that are soluble in methanol and which are readily reduced by carbon or organic complex sources. Examples of suitable metals are, e.g. Ni, Cu, Pt, Pd, Ag, Au, Bi, Cd, Pb, and Sn. Probably also for e.g. Fe, Co, Ru. Use of nitrates can be of advntage for the same reason as discussed in Example 1.

Example 5

Catalysis

A great deal of interest has been devoted to making use of the surplus and green-house gases $CH_4$ and $CO_2$. One very promising answer to this is to convert them to the syn-gas mixture of CO and $H_2$ that is used as starting mixture for a large number of organic products. This is however, not an easy task to accomplish and despite the fact that much research has been put into this area it has been proven difficult to avoid deactivation of the catalyst due to carbon formation. Ni metal supported on oxides has been reported to convert $CH_4$ and $CO_2$ to syn-gas. It has been found however that the Ni particles have to be less than about 5-10 nm in size in order to inhibit growth of carbon filaments on the Ni-particles.

The suitability of the materials described herein for the catalysis of the conversion of $CH_4$ and $CO_2$ to syngas (CO+$H_2$) was preliminary investigated with a gas mixture of $CO_2$ and $CH_4$ in the molar ratio 1:1. The MS signals for $CO_2$, $CH_4$, CO and $H_2O$ were monitored as the temperature was increased from room-temperature to 800° C. In FIG. 6, the conversion degree of $CH_4$ and $CO_2$ is plotted against time and temperature of the 10 and 75 atom % Ni samples.

Figure 4A:
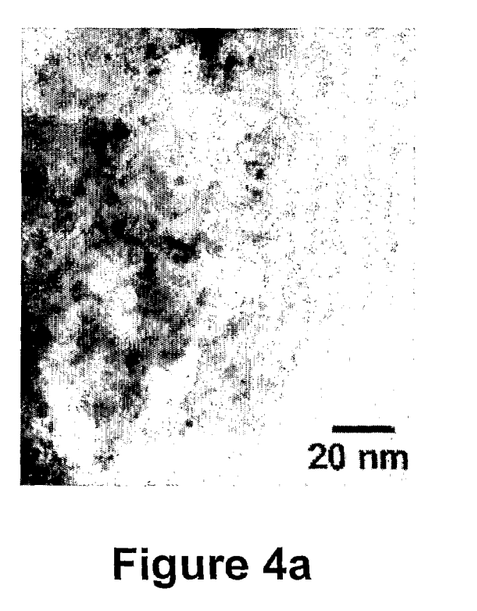
FIG. 4a-b are TEM images of Ni—$Al_2O_3$ composite materials used for catalysis of the reaction of CH4+CO2 to syn-gas mixture with; 10% Ni (No carbon filaments grown) (a) and 75% Ni (carbon-filaments have grown from the large Ni-particles) (b).
Figure 4B:
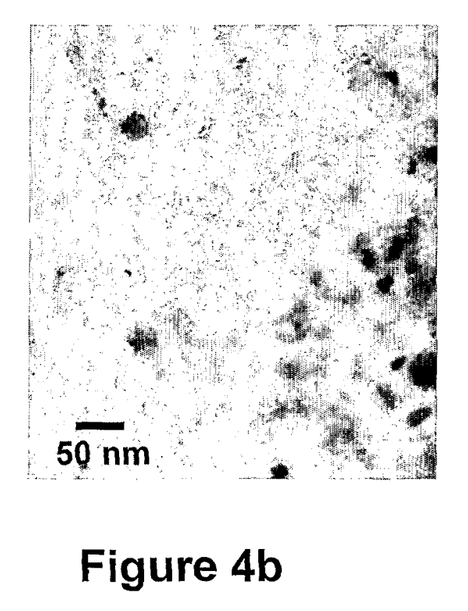

For the material with 75% Ni, the conversion of $CO_2$ and $CH_4$ started at 550° C. and increased rapidly up to 680° C., and above this temperature the $CH_4$ conversion declined while the $CO_2$ conversion continued to increase. After annealing (i.e. heating at a constant temperature) at 800° C. for 30 min, the conversion levels were stabilised. Investigation of this material showed that carbon tubes/fibres had extensively formed on the catalyst surface and that the Ni particles had grown to sizes in the range 5-30 nm. Such a material is shown in FIG. 4.

With the 10% Ni composite, the $CO_2$ and $CH_4$ conversion also started at 550° C., but it continued almost linearly up to 800° C. The linear temperature dependence was confirmed by cycling experiments between 550 and 700° C. However, after about 10 min of annealing at 800° C., the conversion degree of both the $CO_2$ and the $CH_4$ started to increase, which might be due to some change in the material. Investigation of the material annealed for 30 min at 800° C. showed no carbon formation in the SEM, but with TEM it was revealed that in some parts of the catalyst where enlarged Ni particles (about 10-20 nm) were found, carbon had been deposited, but not where the original Ni particle sizes remained.

These findings indicate that the Ni particle size is important for the carbon tube deposition which is detrimental to the catalytic effect. Thus, it seems that the particle sizes, in the 75% Ni composite (about 5-8 nm) are sufficiently large for carbon deposition or are able to grow to large particles by surface migration, but not those of the 10% Ni sample (about 4-7 nm), which is in accordance with the findings of other workers on similar systems normally obtaining dividing metal particle sizes in the range of 5-10 nm. Use of the catalyst at temperatures over 750° C. seems not to be possible since slow carbon deposition starts also for the 10% Ni sample in this temperature range, which is probably due to growth of the Ni particles and subsequent carbon deposition.

The novel solution chemical route developed by the present inventors is capable of producing very porous high surface area structures loaded with 5-8 nm sized Ni particles in alumina and initial tests of these materials have shown that they are active and stable for the syn-gas reaction in the temperature range 500-750° C.

For the sake of comparison a similar material with 5-8 nm sized Ni particles was tried out under the same conditions and it was found, that in accordance to the literature, the Ni was catalysing carbon tube growth and thereby poisoning the catalyst.

Preliminary studies of Ni—$Al_2O_3$ materials have already given very promising results: Catalysis of $CH_4+CO_2$ to the technologically very important CO+$H_2$ mixture was stable in the temperature range 500-750° C. Here all Ni-particles need to be smaller than ca 5 nm to avoid side reactions that can form water and carbon-tubes on the metal particles. By making larger Ni-particles <30 nm in size), carbon-tubes grew from the same gas mixture and poisoned the catalyst.

Example 6

Films for Solar Heat Absorbers

The optical function of most of the currently available solar absorbers is based on thin film optical interference. The most frequently used design for a solar heat-absorber is to cover a surface of high-infrared reflectance with a coating that is selectively absorbing in the solar wavelength range and is highly transparent in the infrared wavelength range. This type is called a tandem solar absorber due to the combination of two surfaces to get the required properties of the surface, i.e. high solar absorptance and low infrared emittance. The latter condition ensures that the surface do not re-radiate the absorbed solar energy.

The chemical durability of the films under changing hot/cold, wet/dry conditions should be high, and for non-protected solar walls or roofs, high mechanical stability is also imperative. The films need to be of high quality, i.e. homogeneous over large areas and crack-free. It should be possible to deposit high quality films on large surfaces with cheap equipment, preferably at 1 atm pressure and with short deposition time. Since the most important substrate for solar absorbers is aluminium only allowing temperatures up to 550-600° C., low preparation temperatures and annealing times are required.

In accordance with the teachings of the present invention, spin-coating with 0.9-1.0 M (total Ni+Al conc.) solutions, prepared as in Example 1 (Ni≈80%), on aluminum plates with a spin rate of 2700 rpm and subsequent heat-treatment in $N_2$ at 30° C. $min^{-1}$ up to 550° C., to provide solar heat-absorber-films resulted in glossy black coatings. The thickness was measured by TEM and SEM microscopy on cross sections to be 100 nm and the nickel particles were in the size range 6-9 nm. XRD and TEM studies showed that the nickel particles were of the face centered cubic (fcc) modification and that the alumina was amorphous and surrounding the nickel particles. SEM images of the surface showed that it was smooth and the particles of even size distributed over the coating and extending through the depth. The coating adhered very strongly to the aluminium substrate and when scraping off coating with a sharp steel object, the separation occurred inside the aluminum rather than between the film and the substrate. In this case the Ni loading was about 80%.

The films were tested as solar heat absorbers. The 100 nm thick film topped with an anti reflection layer of alumina made in the same way as the NIM layer but without nickel addition, showed an absorptance of 0.93 in the visible and a reflectance of 0.04 in the NIR, and the absorption edge between the absorbing range in the visible region and the reflectance part in the NIR region was sharp.

The uncoated films (i.e. films with no anti-reflection layer) had an absorption of 0.83 in the visible range and a thermal emittance of 0.06 in the NIR range.

Further tests on the NIM coating showed a good resistance to weathering.

Example 7

Carbon Tube Growth

With Ni-particles in sizes over about 5-10 nm carbon nanotubes can be grown from the particles from gaseous precursors, e.g. ethene ($C_2H_4$), methane $CH_4$ and carbon-dioxide $CO_2$. With a narrow size distribution of metal particles increased control of carbon tube diameter and structure is obtained which is of high importance for the electric and mechanic properties of carbon nano-tubes. A high loading of separated Ni particles in a film on a surface makes it possible to grow a dense rug of carbon tubes which is important for cold cathode emitters used in light sources.

For Carbon tube formation Ni—$Al_2O_3$ films were prepared by spin-coating on Si/$SiO_2$ substrates and heat-treated in Ar to 600° C.

Preliminary tests of carbon nanotube growth from ethane gas were made using films with 50 and 75 mol-% Ni loading. Dense rugs of carbon tubes were found to form, using a gas mixture of argon, hydrogen and ethene at a pressure of 400 torr, and at temperatures between 400 and 700° C. (300 and 800° C. do not yield good tubes).

Carbon tubes were also formed using a mixture of methane and carbondioxide (see catalysis above).

Although the invention has been described and illustrated by way of examples, it is defined only by the terms of the appended claims, and it can be varied within the scope of said claims. Other examples of applications are magnetic materials for sensors, mechanical protection etc. For soft magnetic applications, e.g. transformers, very high metal loadings, around 90 mol % (short distance between particles) are required to allow for a particle-particle magnetic coupling and large magnetic effects. Applications are found with the NIM:s in film and bulk morphologies.

Further applications that are possible are e.g. protective films, gradients and powders used for sintering into Ni—$Al_2O_3$ compacts are desired for high-performance cutting tool applications and other applications with very high demands on structural integrity. Aluminina is a very light and hard ceramic material, but it is too brittle to thermal and mechanic chock to be used in most applications. By adding metallic nano particles in sizes below ca 20-30 nm in the alumina, composites with a very desirable hardness-toughness combination is expected. A cutting tool bit can consist entirely of the Ni—$Al_2O_3$ NIM sintered with e.g. microwave or spark plasma technique, a base of e.g. WC—Co composite with Ni—$Al_2O_3$ NIM as a surface coating or a gradient from WC—Co to Ni—$Al_2O_3$.

This is a developing field but for future applications metal particles having highly non-isotropic properties are needed, and these are often found in alloy particles, e.g. Pt—Fe. Therefore an expected demand is that complex compositions should be possible to prepare.

What is claimed is:

1. A method of making a composite material comprising metal particles in the nanometer range in a ceramic matrix, the method comprising the steps of:
    providing a metal salt solution of at least two metals in a solvent, wherein the metal salt solution is obtained by combining a first solution and at least one further solution, the first solution and the further solution each comprises a metal and an organic compound capable of strongly coordinating metals, and the metal in the further solution(s) is more easily reducible than the metal in the first solution;
    evaporating the solvent from the metal salt solution to provide a material in a range from a dry powder to a viscous liquid; and
    heating the material in an inert atmosphere to convert the material to a desired composite material.

2. The method as claimed in claim 1, wherein the step of providing a metal salt solution of at least two metals comprises:
    making a first solution of at least one metal-alkoxide compound in a solvent comprising an organic acid and a polar organic solvent, the metal(s) of said compound being capable of forming ceramic oxide(s);
    adding to said first solution a multifunctional organic compound capable of strongly coordinating metal;
    making at least one or more further solution in a polar organic solvent of a metal salt soluble in said polar organic solvent, adding thereto a multifunctional organic compound capable of strongly coordinating metal salts, and combining the further solution(s); and
    combining the first solution and the one or more further solution(s) to provide said metal salt solution of at least two metals.

3. The method as claimed in claim 2, wherein the metal(s) in the first solution is/are selected from the group consisting of: Al, Fe, Mg, Ca, Mg, Ca, and lanthanides.

4. The method as claimed in claim 2, wherein the metal in the further solution(s) is more easily reducible than the metal in the first solution.

5. The method as claimed in claim 2, wherein the first solution comprises a carboxylic acid selected from the group consisting of: acetic acid, propionic acid, and lactic acid.

6. The method as claimed in claim 4, wherein the acidic first solution further comprises metal-nitrate.

7. The method as claimed in claim 2, wherein the alkoxo-group is selected from the group consisting of propoxo, iso-propoxo, sec-butoxo, ethoxo, metoxo, and methoxyethoxo ligands.

8. The method as claimed in claim 7, wherein the metal-alkoxide is Al-iso-propoxide.

9. The method as claimed in claim 2, wherein the multifunctional organic compound contains —OH (alcohol), —NH, =NH (imine), —CO—$CH_2$—CO— (beta-diketonato), —COOC— (ester), —CO—$NH_2$ (amide), or —COO (carboxylic acid) functionalities.

10. The method as claimed in claim 2, wherein the multifunctional organic compound is triethanolamine.

11. The method as claimed in claim 2, wherein the first and the second solutions are stirred separately before combining them.

12. The method as claimed in claim 2, wherein the combined first and second solutions are stirred for an additional period of time.

13. The method as claimed in claim 2, wherein the polar organic solvent is selected from the group consisting of: methanol, ethanol, propanol, iso-propanol, glycol, glycerol, ethylacetate, acetone, dimethylformamide, acetonitrile, and dimethylglycolether.

14. The method as claimed in claim 1, wherein the heating is performed to a temperature in a range above 500° C., so as to produce larger particles.

15. The method as claimed in claim 14, wherein the heating is performed by subjecting the material to a temperature ramp of 1-100° C. min$^{-1}$, in order to reach the desired temperature.

16. The method as claimed in claim 1, wherein the evaporating is performed while spraying the metal salt solution onto an object.

17. The method as claimed in claim 1, wherein the evaporating is performed by exposing the metal salt solution to a stream of $N_2$ gas, or to low pressure produced by a water-jet pump connected to a tap/faucet or by a vacuum pump.

18. The method as claimed in claim 1, wherein the composite material is any of a powder, a film or a coating.

19. The method as claimed in claim 1, wherein the composite material formed is a coating or a film.

20. A precursor material for the preparation of ceramic material with nano-sized metal inclusions according to the method as claimed in claim 1, comprising a mixture of a first solution of:
- at least one metal-alkoxide compound in a solvent comprising an organic acid and a polar organic solvent, and a multifunctional organic compound capable of strongly coordinating metal ions, the metal(s) being capable of forming a ceramic oxide(s), and
- a second solution of a metal salt soluble in said polar organic solvent further comprising a multifunctional organic compound capable of strongly coordinating metal ions, wherein said precursor material exhibits rheological properties in a range from a dry powder to a viscous liquid.

21. The method as claimed in claim 4, wherein the metal in the further solution(s) is Co, Ni, Cu, Pt, Pd, Ag, Au, Bi, Pb, Sn, Fe, Ru, W, Mo, or V.

22. The method as claimed in claim 6, wherein the metal-nitrate is $Al(NO_3)_3 \cdot 9H_2O$.

23. The method as claimed in claim 9, wherein at least one of the functionalities inhibit crystallization of metal salt in solution.

24. The method as claimed in claim 11, wherein the first solution and the second solution are stirred separately for at least 15 minutes before combining them.

25. The method as claimed in claim 12, wherein the combined first solution and second solution are stirred for an additional period of time of at least 15 minutes.

26. The method as claimed in claim 14, wherein the heating is performed to a temperature in a range of from 500° C. to 600° C.

27. The method as claimed in claim 15, wherein the temperature ramp is 10-50° C. min$^{-1}$.

28. The method as claimed in claim 19, wherein the coating or film is made by spin-coating, dipping, spraying or painting the metal salt solution or a partly evaporated metal salt solution.

* * * * *